F. M. CONWELL.
CLUTCH.
APPLICATION FILED JAN. 17, 1916.
1,220,320.
Patented Mar. 27, 1917.
2 SHEETS—SHEET 1.
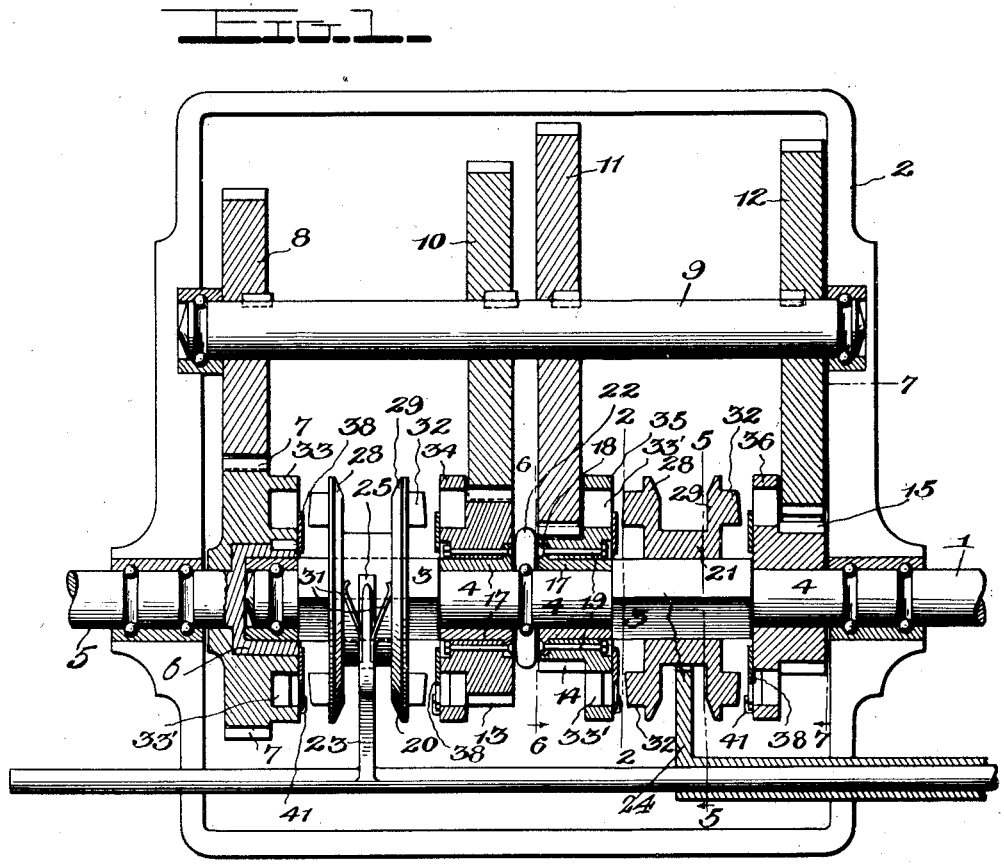
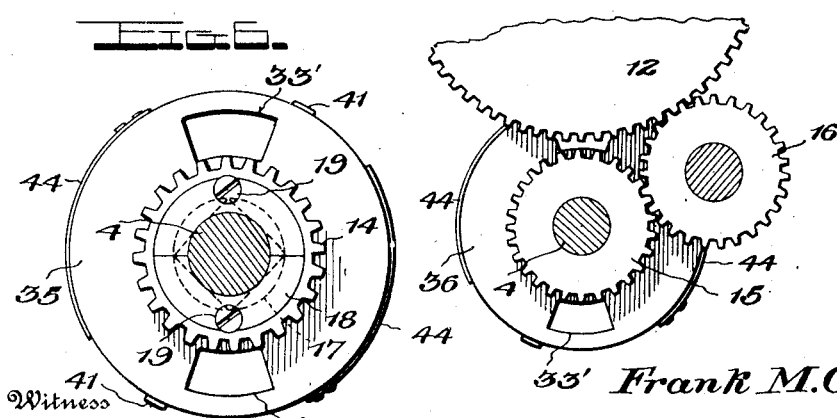
Inventor
Frank M. Conwell,
Witness
Chas. L. Griestauer.
By Bacon & Milans
Attorneys F. M. CONWELL.
CLUTCH.
APPLICATION FILED JAN. 17, 1916.
1,220,320.
Patented Mar. 27, 1917.
2 SHEETS—SHEET 2.
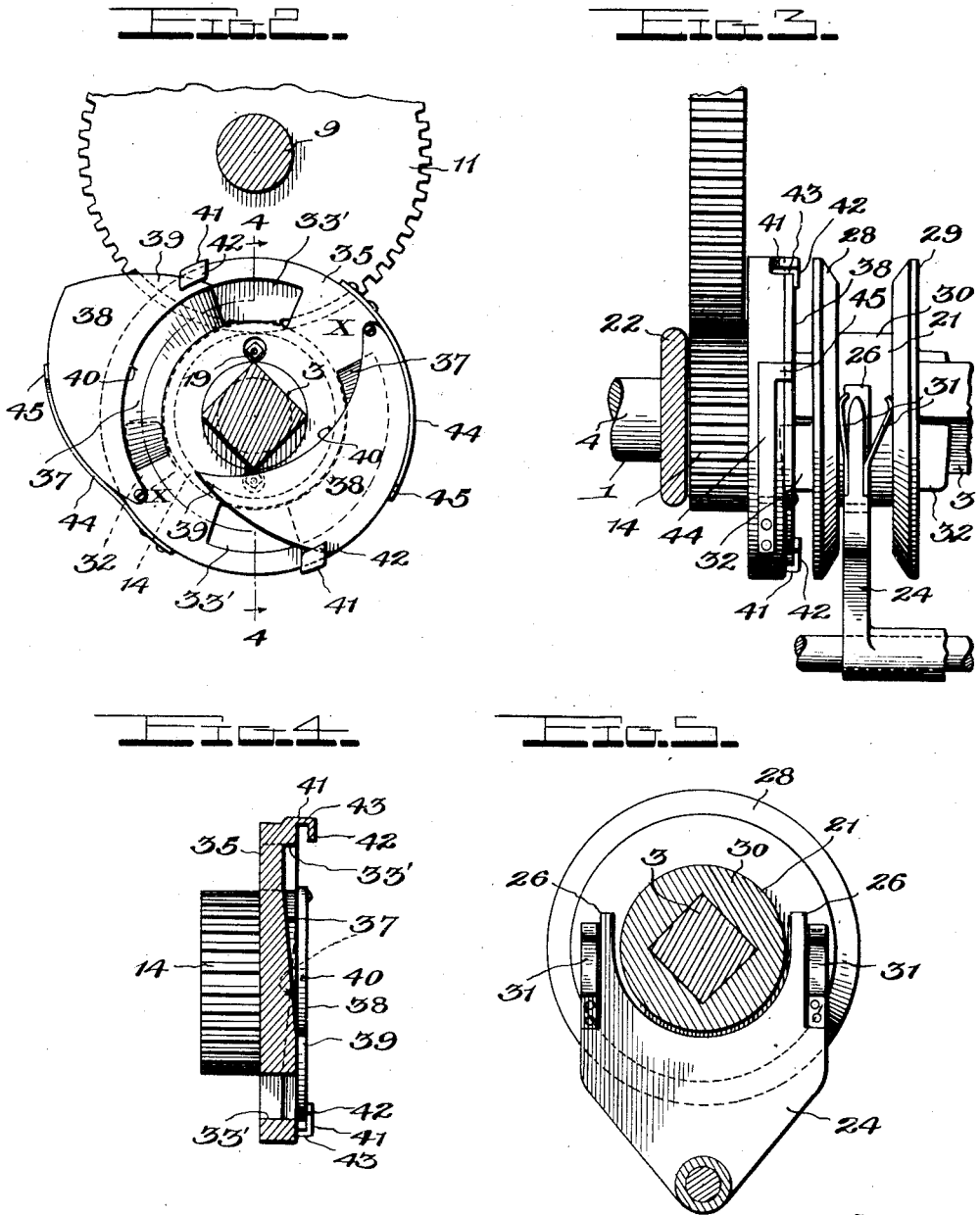
Inventor
Frank M. Conwell,
Witness
Chas. L. Grieshaur.
By
Bacon Milans
Attorneys

UNITED STATES PATENT OFFICE.

FRANK M. CONWELL, OF BLAIRSTOWN, MISSOURI.

CLUTCH.

1,220,320.

Specification of Letters Patent.

Patented Mar. 27, 1917.

Application filed January 17, 1916. Serial No. 72,537.

*To all whom it may concern:*

Be it known that I, FRANK M. CONWELL, a citizen of the United States, residing at Blairstown, in the county of Henry and State of Missouri, have invented certain new and useful Improvements in Clutches, of which the following is a specification, reference being had therein to the accompanying drawing.

The invention relates to improvements in clutches which are particularly adapted for use in an automobile transmission of the sliding key type, although it will be clearly apparent that the same is applicable for use wherever a clutch is needed for coupling driving and driven members.

Heretofore in the art where it is customary to use a sliding clutch member having lugs projecting therefrom, when the clutch is shifted into engagement with the adjacent clutch disk to couple the driven and driving members it very often happens that only the outer portions of the lugs enter the sockets in the clutch disk owing to the rapid rotation of the clutch. This construction has been found to be very unsatisfactory in view of the fact that when only small portions of the lugs enter the sockets the lugs will not stand the strain placed upon them and the end portions thereof will be chipped, or battered off. In some instances the lugs are completely severed from the clutch, and the stripping of the gear teeth of the various gears of the transmission is a common occurrence with the prior art devices. The noise incident to an operation of this character is also usually rather great, which obviously adds considerable discomfort to the occupants of the machine.

It is one of the objects of the present invention to provide a clutch overcoming the objections heretofore encountered in which the lugs on the movable clutch member are gradually led to the sockets therein, and are admitted, the major portion, into the sockets the instant the lugs register with the sockets in the clutch disk. This is accomplished by the provision of means adapted to guard or overlie a portion of the sockets in the clutch disks which prevents the entrance of the lugs carried by the clutch members thereto after the clutch members have been shifted until these lugs have passed a considerable distance around the face of the crank disk and have gradually raised or moved the guarding means for the sockets prior to their admission into the sockets. When the lugs after raising the guarding means for the sockets are brought into alinement with the sockets they will instantly be admitted a substantial distance therein, so as to withstand all necessary strain placed upon them.

The preferred structure of the invention comprises a plurality of clutch disks, each having fitted thereto a gear wheel, and the provision of a plurality of slots or guideways of curved formation in each clutch disk. The slots at the points where the lugs enter them are very shallow and gradually increase in depth toward their outer ends, each slot terminating at one of the sockets in the clutch disk. Each slot and its socket is protected by a segmental plate that is relatively narrow at its ends and has a portion thereof overlying or protecting its slot and shaft so that when the clutch is shifted the lugs thereon will not be permitted to directly enter the sockets in the clutch disk, but must start at the entrance of the slots leading to the sockets and gradually pass through the slots to raise the segmental closure plates which bear on the lugs a sufficient distance to allow the lugs to enter the sockets when they reach the ends of the slots forming guiding grooves leading to the sockets. The clutches each comprise opposite parallel clutch faces, one clutch being arranged between each pair of gears, and resiliently acting upon these clutches after the same have been shifted are spring members attached to the shifting mechanism for the clutches which tend to force the lugs into the sockets when they are brought into alinement therewith, and at the same time, of course, hold these lugs within the slots in the clutch disks after their passage therein. When the lugs are brought into alinement with the sockets within the clutch disks the spring pressure acting upon the clutch members instantly forces these lugs into the sockets, to provide a postive coupling action.

In the accompanying drawings forming part of this application, I have described the preferred embodiment of the invention in which—

Figure 1 is a side elevation with parts broken away in sections.

Fig. 2 is a detail view of one of the clutch disks showing the position of the closure plates.

Fig. 3 is a view looking at one side of the movable clutch when the same has been shifted.

Figs. 4, 5, 6, and 7 are detail views of various parts of the device.

Referring more particularly to the drawings wherein like numerals indicate corresponding parts, the numeral 1 designates a driving shaft passing through the gear casing 2, which is of the ordinary construction, and the shaft is formed with hexagonal portions 3 thereon forming seats for the starting clutch members 20 and 21. The shaft is also provided with relatively round bearing portions 4 upon which the various gear wheels to be presently described are loosely mounted. Sleeved upon the shaft 1 is a driven shaft 5 having a socket portion 6 at its inner end loosely fitting over the end portion of the shaft 1, so that there is no positive connection between the adjacent ends of the driving and driven shaft. The shaft 5 has rigidly attached thereto in any suitable manner a driving gear wheel 7 meshing at all times with the gear wheel 8 keyed to the counter shaft 9, which is also arranged within the gear casing 2 and disposed parallel with respect to the driving shaft 1. The end portions of the counter shaft are journaled within sockets arranged in the side walls of the gear casing and are freely rotatable. The counter shaft in addition to carrying the gear wheel 8 also carries the gear wheels 10, 11 and 12 rigidly fastened thereto and rotatable with the shaft, following the usual construction of counter shaft, and meshing at all times with the loosely mounted gears 13, 14 and 15 carried by the driving shaft 1. The gear wheel 12 on the counter shaft—and the gear wheel 15 on the driving shaft have interposed therebetween a relatively small pinion 16 to permit the driven shaft to be reversed upon the coupling of the gear wheel 15 with the drive shaft, by the action of the clutch mechanism to be later described, the remaining gears on the counter shaft and drive shaft being change speed gears of the usual construction.

The gear wheels 13 and 14 have relatively large central openings therein, so that in assembling they may be passed over the hexagonal portions 3 of the shaft, and in order to loosely retain these gears in place sectional bearings are fitted on the rounded portions of the shaft. These bearings comprise parts 17 secured together in any suitable manner and having circumferential outstanding flange portions 18 constituting seats for one side of each of the gear wheels when the bushings or bearings and the gear wheels are coupled together by the coupling pins 19 passing therethrough. The bearings are, of course, loose on the shaft and only turn with the shaft when their respective gears are coupled to the shaft by the clutch members. The gear wheels 7, 13, 14 and 15 are arranged in pairs and have disposed therebetween the sliding clutches 20 and 21. Interposed between the gear wheels 13 and 14 is a circular collar or member 22, which prevents any relative movement of these gear wheels toward or from each other.

The clutches 20 and 21 are of the same construction, but are independently operable by means of the levers 23 and 24, and yoke portions 25 and 26 respectively, and it is, of course, apparent that while two of these clutches are illustrated in the present embodiment of the invention any number may be used in keeping with the number of gears on the drive shaft. As the sliding clutches 20 and 21 are of the same specific construction and operate in the same manner a description of one will suffice for both. The clutch 21 has a hexagonal opening slightly larger than the hexagonal portion 3 on the shaft, and while this clutch is slidable with the shaft, the same rotates with the shaft at all times. The clutch comprises a pair of parallel spaced clutch faces 28 and 29 which are oppositely disposed and connected by a central web portion 30. The space between the clutch faces is utilized for the reception of the yoke 26 that has its spaced arms arranged between the parallel faces of the clutch and bears on each side spring members 31 engaging the inner faces of the clutch for a purpose that will hereinafter appear, there being one pair of springs carried by each of the arms of the yoke. A similar yoke 25 of the same construction as the yoke 26 is fitted between the parallel faces of the clutch 20. The yoke portions 25 and 26 are connected at their outer ends with the slidable members 23 and 24 respectively, the member 23 telescoping with the member 24, each of these members being connected in any suitable manner with a shifting mechanism not shown. On each outer face of the clutch 21 are a plurality of outstanding lugs 32 having beveled outer edges receding from and engaging the walls of suitable sockets in the clutch plates which are adapted to couple either of the gear wheels 14 or 15 to the shaft 1, so as to impart motion to the counter shaft. It will, of course, be seen that the coupling of the gear wheels 14 and 15 depends upon the direction in which the clutch is shifted, the clutch action being accomplished by the entrance of the projections 32 into the sockets 33 arranged within the clutch disks connected to the gears in a manner to be presently described. The clutch 20 couples the gear 13 to the shaft when shifted to the right, so as to impart second speed to the driven shaft 5 through the medium of the counter shaft and the gear wheel 7, therein and when shifted to the left provides a direct drive between the shaft 5 and the driving shaft 1, by connecting the clutch face carried by the gear wheel to the sliding clutch 20.

Each of the gear wheels 7, 13, 14 and 15 have formed integral therewith clutch disks or plates 33, 34, 35 and 36, which may be of any suitable construction, such for instance as a mere socket within the face of the gear wheel, and as these clutch disks are all of the same specific construction and operate in exactly the same manner, a description of one will answer for all, and a detailed description of the clutch disk 35 will therefore be given.

This clutch disk is cast with its gear wheel and has formed in its face a plurality (two being shown) of curved guide-ways 37, which gradually increase in depth from their beginning point, each slot or guide-way leading to its socket 33', which passes through the clutch disk. At the point where these slots or guide-ways terminate they project a substantial distance within the clutch disk, and obviously good results could be had by eliminating the sockets altogether and having the guide-ways project quite a distance within the clutch disk at a point where they terminate, so as to provide a substantial abutment for the clutch lugs.

In order to prevent the outer portions of the lugs 32 from entering the sockets 33' when the clutch 21 has been shifted and the position of these lugs are such that they are in axial alinement with the sockets in the clutch disk, segmental closure plates 38 are pivoted to the face of each clutch, one closure plate being employed to overlie each slot and a portion of its socket. Each of these plates is relatively narrow at its pivotal point to provide an entrance designated by the letter X for the passage of the lug to the slot when the clutch has been shifted into engagement with the face of the clutch disk and is rotating with the shaft. The plates 38 are widest at substantially their centers, gradually increasing in width from each end. The greater portion of the outer edge of each plate lies flush with the periphery of the clutch disk, and is formed with an inwardly extending portion 39, which is relatively narrow and overlies or closes a portion of its socket 33', the narrow portion of each plate 39 being such that little or no friction is placed upon the lug when this portion of the plate is bearing thereon, which is the case when the lug is interposed within the socket. The inner edge of each plate 38 forms a smooth cam bearing surface 40, which is substantially continuous and offers no projections to the lug of the clutch when the same is riding along the edge of this plate to effect the raising thereof, which, of course, opens prior to the admission of the lug to the socket. The guide 41, which is preferably cast integral with the clutch disk, although this construction is not essential, is provided with an outstanding portion 42 projecting at right angles to the clutch disk and has a flange portion 43 forming an abutment or stop for its closure plate and prevents any lateral movement of this plate. The plate passes through the flange which permits the same to be raised or lowered, but, of course, prevents the same from being shifted laterally. A guide is provided for each plate.

As a convenient means for retaining the segmental plates 38 in their normal or closed position spring members 44 are provided which are secured to the periphery crank disks, and each has an offset portion 45 overlying the periphery of the segmental closure plates 38, whereby these plates are normally held closed and must be moved against the tension of the springs before the lugs are allowed to enter the sockets.

When either of the clutch members 20 or 21 is shifted the lugs thereon cannot directly enter the slots 33' within the clutch disks as these slots as well as their sockets are protected by the closure plates 38. In order to enter the sockets the lugs must gradually pass through the slots 37 leading to the sockets and raise the closure plates by engaging the cam edges 40, thereof, until these plates have been raised a sufficient distance to permit the entrance of the lugs into the sockets. When the clutch 21 is shifted to the right the lugs 32 thereon are driven around the face of the clutch disks 36 until they reach the position indicated by the letter X, at which time the outer edges of the lugs will engage the inner cam surfaces 40 of the closure plates and upon the continued rotation of these lugs the closure plates will be gradually raised, the lugs being held in engagement therewith by means of the spring members 31 connected to the shifting yoke 24. In this way it will be seen that when the lugs have passed through the slots in the clutch disks, and after the plates have been sufficiently raised or moved to allow them to enter the sockets within the clutch disks the spring members instantly throw these lugs within the sockets. When the lugs enter the sockets within the clutch disk 35 a positive coupling between the driving shaft and the gear wheel 14 is insured, and rotation is then imparted to the driven shaft through the medium of the gear wheels 8 and 10 on the counter shaft and the gear wheel 7 on the driven shaft. When the clutch 21 is shifted to the right by the lever 24 the lugs thereon enter the sockets within the clutch disks 36 formed integral therewith, which connects the gear wheel 15 with the shaft and through the medium of the pinion 16 and gear wheels 7, 8 and 12 a reverse movement is given the driven shaft, the lugs 32 on the clutch member entering the sockets within the clutch disks in the same manner as heretofore described. When the clutch 20 is shifted by the lever 23 to the right the gear wheel 13 will be coupled with the drive shaft and this gear wheel by meshing with the gear 10 on the counter shaft will, of course, impart the desired speed to the driven shaft. When a direct drive is necessary the clutch 20 is shifted to the left, the lugs thereon entering the sockets within the clutch plate or disk 33 formed integral with the gear wheel 7, which is attached to the driven shaft and in this manner imparts a very high speed to the driven shaft. The clutches whenever they are shifted are held in frictional contact with the faces of the clutch disks by means of the flat springs 31 carried by the shifting mechanism which exerts a continual pressure forcing them into engagement with the clutch disks and tending to thrust the lugs carried thereby into the sockets within the clutch disks the instant these lugs are brought into alinement with the sockets 33', after the plates or closures have been raised.

Having thus described the parts, the operation is as follows:

If it is desired to drive the driven shaft at first speed, the clutch 20 is shifted to the left so that the lugs thereon enter the slots within the clutch disks 33, forming a part of the gear wheel 7, which is attached to the driven shaft, which results in the imparting of a relatively high speed to the driven shaft. Second speed is obtained by shifting the clutch 20 to the right so that the lugs 32 thereon are forced within the sockets arranged in the clutch disk 34 at the proper time so that the gear wheel 13 is coupled with the drive shaft, it being apparent that the gear 10 carried by the counter shaft meshes at all times with the gear 13 and imparts a second speed to the driven shaft in the usual manner. Third speed is obtained by shifting the clutch 21 to the left so as to couple the gear wheel 14 with the driving shaft, this gear wheel imparting a driving movement to the relatively large gear wheel 11 on the counter shaft, which drives the driven shaft through the gears 7 and 8.

In order to reverse the movement of the shaft 5 it is necessary to shift the clutch 21 to the right to connect the gear wheel 15 with the drive shaft, which rotates the gear 12 through the medium of a pinion 16, which is of the ordinary construction and is commonly used when the driven shaft is reversed.

While the preferred embodiment of the invention is illustrated and described, I wish it to be understood that many changes in the details of construction and parts can be made without departing from the spirit of the invention.

What I claim is:

1. In a device of the character described, the combination with a rotatable shaft, having a sliding clutch member rotating therewith, said clutch member being provided with a lug, of a clutch part adjacent the clutch member having a guiding slot leading to a socket within the clutch part, means for protecting said slot and a portion of the socket, means for shifting the clutch member into engagement with the clutch part whereby the protecting means is moved upon the rotation of the clutch member by the lug passing through the guiding slot prior to the admission of the lug into the socket.

2. In a device of the character described, the combination with a shaft having a slidable clutch member rotating therewith, said clutch member being provided with a lug, of a clutch part being provided with a socket arranged adjacent the clutch member, means for protecting said socket, and means for shifting the clutch member into engagement with the clutch part whereby the protecting means is moved upon the rotation of the clutch member by the lug thereon prior to the admission of the lug within the socket.

3. In a device of the character described, the combination with a shaft having a slidable clutch member carried thereby and rotatable with the shaft, said clutch member having a lug thereon, of a clutch part being provided with a guiding slot gradually increasing in depth and leading to a socket within the clutch part, means overlying said guiding slot and socket, and means for shifting the clutch member into engagement with the clutch part whereby the protecting means for the guiding slot and socket is moved during the rotation of the clutch member while the lug thereon is passing through the guiding slot prior to its entrance into the socket.

4. In a device of the character described, the combination with a shaft having a slidable clutch member carried thereby and rotatable with the shaft, of a clutch part being provided with a guiding slot gradually increasing in depth and leading to a socket within the clutch part, means overlying said guiding slot and socket, and means for shifting the clutch member into engagement with the clutch part whereby the protecting means for the guiding slot and socket is moved during the rotation of the clutch member while the lug thereon is passing through the guiding slot prior to its entrance into the socket, and resilient means acting upon said clutch member for forcing the same into engagement with the clutch part.

5. In a device of the character described, the combination with a shaft, a sliding clutch member having a lug thereon carried by the shaft and rotatable therewith, a clutch plate arranged adjacent the sliding clutch member and having in its face a guiding slot leading to a socket, a closure overlying said slot and socket, and means for shifting the clutch member into engagement with the clutch plate whereby the closure is gradually moved during the passage of the lug on the clutch member through the slot to allow the lug to enter the socket after the same has traveled through the slot.

6. In a device of the character described, the combination with a rotating shaft having a clutch member rotatable therewith and provided with a lug thereon, of a clutch part adjacent the slidable clutch member and having a guiding slot gradually increasing in depth from its beginning and leading to a socket, a movable closure for said slot and socket, and means for shifting the clutch member into engagement with the clutch part whereby the closure is moved upon the rotation of the clutch member by the passage of the lug through the slot to permit its entrance into the socket.

7. In a device of the character described, the combination with a rotating shaft having a clutch member rotatable therewith and provided with a lug thereon, of a clutch disk adjacent the slidable clutch member and having in its face a guiding slot gradually increasing in depth from its beginning and leading to a socket, a movable closure for said slot and socket, and means for shifting the clutch into engagement with the clutch disk whereby the closure is moved upon the rotation of the clutch member by the lug passing through the slot to permit its entrance into the socket, and resilient means for forcing the clutch member into engagement with the clutch disk after the same has been shifted.

8. In a device of the character described, the combination with a rotatable shaft having a sliding clutch member provided with a lug thereon rotatable with the shaft, a clutch plate adjacent the clutch member having a guiding slot in its face leading to a socket, a closure carried by the clutch plate and overlying the guiding slot and socket, resilient means for retaining the closure in its normal position, and means for shifting the clutch member into engagement with the clutch plate whereby the lug thereon upon the rotation of the clutch member passes through the guiding slot and gradually lifts the closure to permit the said lug to enter the socket.

9. In a device of the character described, the combination with a shaft, a clutch member having a projection thereon slidably mounted on said shaft and rotatable therewith, of a clutch plate being provided with a socket therein arranged adjacent the slidable clutch member, a closure normally overlying a portion of the socket within the clutch plate, and means for shifting the clutch member into engagement with the clutch plate whereby the closure is moved upon the rotation of the clutch member by the projection thereon to permit its entrance into the socket.

10. In a device of the character described, the combination with a shaft having a slidable clutch member provided with a lug thereon rotatable with the shaft, a clutch disk adjacent the clutch member having a socket in its face and having a guideway leading thereto, a pivoted closure overlying a portion of the socket within the clutch disk, and means for shifting the clutch member into engagement with the clutch disk whereby the pivoted closure is raised upon the rotation of the clutch member by the lug thereon, and the lug being gradually admitted to the socket through the guideway.

11. In a device of the character described, the combination with a rotatable shaft, of a clutch member, having a lug thereon slidably mounted on said shaft and rotatable therewith, a clutch part adjacent the clutch member having a guiding slot leading to a socket within the clutch part, a movable closure protecting the slot and overlying a portion of the socket, a resilient member engaging the closure for normally maintaining the same in a lowered position, and means for shifting the clutch member into engagement with the clutch part whereby the lug thereon during the rotation of the clutch member passes through the slot within the clutch part and gradually moves the closure to permit the lug to enter the socket.

12. In a device of the character described, the combination with a rotatable shaft, of a clutch member, having a lug thereon slidably mounted on said shaft and rotatable therewith, a clutch plate adjacent the clutch member having a guiding slot in its face leading to a socket within the clutch plate, a movable closure protecting the slot and overlying a portion of the socket, and means for shifting the clutch member into engagement with the clutch plate whereby the lug thereon during the rotation of clutch member passes through the slot within the clutch plate and gradually moves the closure to permit the lug to enter the socket, and resilient means acting upon the clutch after the same has been shifted for holding the clutch member into frictional contact with the clutch plate.

13. In a device of the character described, the combination with a rotating shaft, having a clutch member slidable thereon, a lug on said clutch member, of a clutch part adjacent the clutch member and being provided with a guiding slot therein leading to a socket, a movable closure plate pivotally attached to said part and overlying the slot and socket, resilient means for normally retaining the closure plate in a closed position, and means for shifting the clutch member into engagement with the clutch part whereby the lug on the clutch member moves the closure plate during its passage through the slot prior to its entrance into the socket.

14. In a device of the character described the combination with a rotating shaft having a clutch member provided with a lug slidable thereon, of a clutch disk adjacent the slidable clutch member and provided in its face with a slot gradually increasing in depth from its beginning and leading to a socket, a closure for said slot and socket, and means for shifting the clutch member into engagement with the clutch disk whereby the lug thereon moves the closure during its passage through the slot upon the rotation of the clutch member to permit its entrance into the socket.

15. In a device of the character described, the combination with a rotating shaft having a clutch member slidable thereon, said clutch member being provided with a lug, of a clutch disk adjacent the slidable clutch member and provided in its face with a slot gradually increasing in depth from its beginning and leading to a socket, a closure for said slot and socket, means for retaining the closure in its normal position, and means for shifting the clutch member into engagement with the clutch disk whereby the lug thereon moves the closure during its passage through the slot upon the rotation of the clutch member to permit its entrance into the socket, and resilient means carried by the shifting mechanism for the clutch member to hold the clutch member into engagement with the clutch face.

16. In a device of the character described, the combination with a rotatable shaft having a slidable clutch member provided with a lug thereon, a clutch disk adjacent the clutch member having a socket within its face, a closure plate pivoted to the clutch disk and overlying the socket, a resilient means for holding the closure over the socket, a guide through which said plate passes for preventing lateral movement thereof, means for shifting the clutch member into engagement with the clutch disk whereby the lug thereon upon the rotation of the clutch member actuates the closure prior to its admission to the socket, resilient means for forcing the clutch member into engagement with the clutch disk after the clutch member has been shifted.

17. A clutch of the character described, comprising separable interfitting male and female parts, a guide-way leading to the interfitting female part, and means for preventing the coupling of the male and female parts when they are approaching coupling relation save by the passage of the interfitting male part through the guide-way in the female part.

18. A clutch of the character described, comprising separable interfitting male and female parts, a guide-way leading to the interfitting female part, and means for preventing the coupling of the male and female parts when they are approaching coupling relation save by the passage of the interfitting male part through the guide-way in the female part, and yieldable means for forcing the parts into coupled position adapted to be placed under tension when the male member is traversing the guide-way in the female member and to thrust the parts into coupled position at the end of said guideway.

19. A clutch of the character described, comprising separable interfitting male and female parts, a guide-way leading to the interfitting female part, a movable closure overlying said guide-way and female part for preventing the coupling of the male and female parts when they are approaching coupling relation, save by the passage of the interfitting part of the male member through the guide-way in the female member.

In testimony whereof I hereunto affix my signature in the presence of two witnesses.

FRANK M. CONWELL.

Witnesses:
 FLOYD HENDERSON,
 FRANK M. CAUSLAND.